No. 697,524. Patented Apr. 15, 1902.
C. E. McINTIRE.
ROLLER BUSHING FOR SHEAVES.
(Application filed May 23, 1901.)
(No Model.)
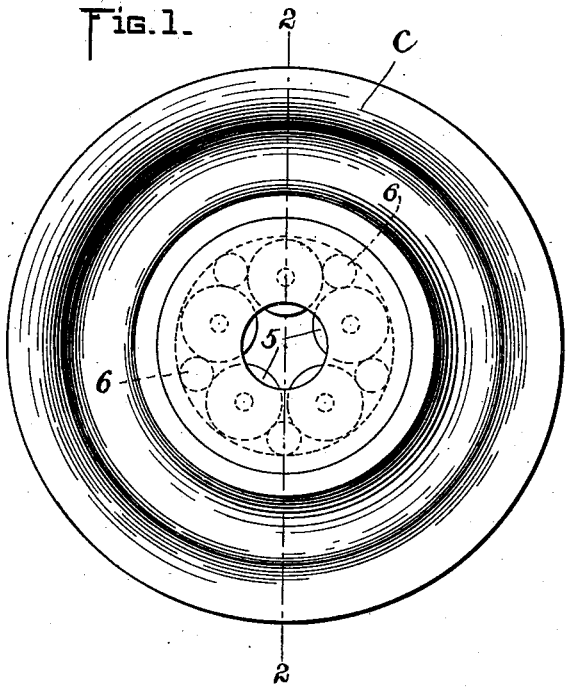
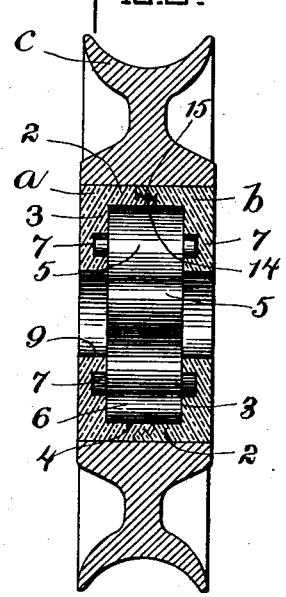
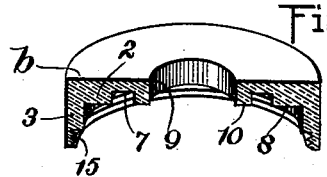
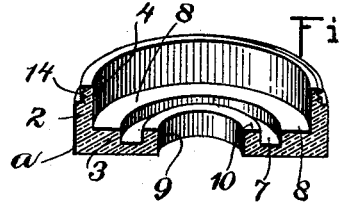
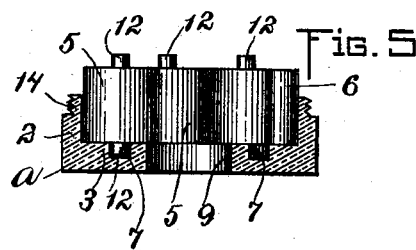
WITNESSES:
A. H. Brown.
H. Joseph Doyle
INVENTOR:
Clarence E. McIntire
by Wright, Brown & Quinby
Attorneys

UNITED STATES PATENT OFFICE.

CLARENCE E. McINTIRE, OF CAMDEN, MAINE, ASSIGNOR TO THE DUPLEX ROLLER BUSHING COMPANY, OF CAMDEN, MAINE, A CORPORATION OF MAINE.

ROLLER-BUSHING FOR SHEAVES.

SPECIFICATION forming part of Letters Patent No. 697,524, dated April 15, 1902.

Application filed May 23, 1901. Serial No. 61,550. (No model.)

*To all whom it may concern:*

Be it known that I, CLARENCE E. MCINTIRE, of Camden, in the county of Knox and State of Maine, have invented certain new and useful Improvements in Roller-Bushings for Sheaves, &c., of which the following is a specification.

This invention relates to a bushing for sheaves and pulleys, the bushing comprising a cylindrical chamber formed for attachment to the center of a pulley and adapted to present a cylindrical bearing to the peripheries of a series of rolls and to confine said rolls against displacement in any direction, the rolls being arranged in a circular series surrounding the pin or shaft on which the pulley rotates.

The invention consists in the improvements which I will now proceed to describe and claim.

Of the accompanying drawings, forming a part of this specification, Figure 1 represents a side elevation of a sheave or pulley having a bushing embodying my invention. Fig. 2 represents a section on line 2 2 of Fig. 1. Figs. 3 and 4 represent perspective sectional views of the two members of the bushing, said parts being separated and the rolls removed. Fig. 5 represents a sectional view of one of the members of the bushing with the rolls inserted therein.

The same reference characters indicate the same parts in all of the figures.

$c$ represents the body of the sheave, which is cast or otherwise formed with a central aperture or socket to receive the bushing, the latter being composed of two members $a\ b$, which are formed to have a drive fit in the wall of the socket in the pulley $c$, so that they can be forced into the socket by strong pressure and when inserted are held by friction in the pulley. Each member comprises a cylindrical marginal portion 2 and a flange 3, formed on one end of the said marginal portion. The inner ends of the marginal portions of the two members are formed to be detachably and positively coupled or connected together within the pulley, as shown in Fig. 2, the two members collectively forming a bushing having a chamber with a cylindrical marginal bearing-surface 4, which constitutes the outer bearing for a series of bearing-rolls 5 and a series of separating-rolls 6. The coupling or connecting means comprise an external screw-thread 14, formed on the member $a$, and an internal screw-thread 15, formed on the member $b$.

Each of the flanges 3 is provided in its inner side with an annular groove 7, said groove being separated from the marginal face 4 by an outer bearing-surface 8 and from the inner margin 9 of the flange by an inner bearing-surface 10. These two bearings 8 and 10 are annular and support the ends of the rolls 5 and 6—that is to say, the ends of the rolls 5 extend across the two end bearing-surfaces 8 and 10 and are supported thereby against endwise displacement, while the ends of the separating-rolls 6 bear only against the outer end-thrust bearings 8. The grooves 7 receive trunnions 12, formed on the ends of the bearing-rolls 5.

In assembling the parts above described the rollers 5 and 6 are assembled in one of the bushing members, as shown in Fig. 5. The other bushing member is then positively connected to the roll-receiving member, and the connected members are then inserted and forced into the socket of the pulley, as shown in Fig. 2.

As shown in the drawings, the marginal portions 2 of the members $a\ b$ meet at the middle of the cylindrical opening of the sheave or pulley. This provides a construction which enables any two members $a\ b$ to be equally well secured in place by the drive fit above described, the two members receiving equal amounts of pressure and wear from the rolls 5. Briefly stated, the described construction of the members adapts them to be properly secured in the cylindrical opening of a metal sheave or pulley solely by a drive fit, so that said members are practically inseparable from the pulley. Obviously these features of advantage could not be possessed by a wooden sheave or pulley, for the reason that the members $a\ b$ could not be held therein solely by friction or a drive fit. The invention is therefore particularly adapted to metallic sheaves.

It will be seen that the outer and inner end-thrust-bearing faces 8 and 10, formed on the flanges constituting the end walls of the roller-receiving chamber, distribute the wear on the ends of the bearing-rolls 5 at both sides of the centers of said rolls, so that the wear on the ends of the rolls and on the inner faces of the flanges which support the end thrust of the rolls is reduced to a minimum.

An important feature of my invention is the bushing made in two sections or members with complemental coupling devices, such as the screw-threads 14 and 15, the two members when coupled together being rigidly connected and forming virtually a one-part bushing which retains the rolls in operative position and is ready for insertion in a metal sheave, the rolls being held by the bushing in position to surround the shaft or spindle on which the sheave rotates. The advantages of this feature of my invention are as follows:

First. The bushing members, with their coupling means, permit the bushing as a whole to be set up at the place of manufacture and stored until wanted and shipped to users, who may insert them in their own sheaves, all without separating the members or disturbing the arrangement of the rolls therein.

Second. When the complete bushing is driven into the sheave, the coupling devices connecting the members enable either member to assist in holding the other, so that in case one member should be a trifle loose while the other has a tight friction fit in the sheave the loose member is prevented from working outwardly by the coupling devices connecting it to the tight member.

Third. When the bushing is being pressed into the sheave, the coupling devices connecting the two members insure the same relation of the members after they are forced to place in the sheave that they occupied before being forced in, whereas if the two members are separate and driven independently into the sheave one may be forced in slightly askew, so that the bearing-surfaces for the peripheries and ends of the rolls will be out of their proper adjustment and excessive and injurious wear of the rolls will take place.

The rolls are preferably made of cold-rolled case-hardened steel and for marine use are preferably coated with a non-corrosive coating applied by electrodeposition, said coating preventing the rolls from being rusted by salt water.

I claim—

A roller-bushing comprising two separable bushing members adapted to enter a socket in a sheave or pulley, and having positive connecting devices at their meeting inner ends, each member having a cylindrical recess in its inner side, the margin of which forms a raceway, and an annular flange at its outer end forming an end wall of the recess, said flange having in its inner side an annular groove separated from the raceway margin and from the inner edge of the flange by outer and inner annular bearing-surfaces, a series of bearing-rolls in contact with the cylindrical margin of the chamber and having trunnions projecting into the grooves of the flanges, and a series of separating-rolls in contact with the said cylindrical margin and with the bearing-rolls, the ends of the separating-rolls bearing against the outer bearing-surfaces, while the ends of the bearing-rolls bear against both the outer and the inner bearing-surfaces.

In testimony whereof I have affixed my signature in presence of two witnesses.

CLARENCE E. McINTIRE.

Witnesses:
ROY H. MARKS,
FRED W. GREY.